(12) United States Patent
Chiu et al.

(10) Patent No.: US 8,959,262 B2
(45) Date of Patent: Feb. 17, 2015

(54) SYSTEM AND METHOD FOR ACCELERATING SIGNAL TRANSMISSION

(75) Inventors: Tang-En Chiu, Taipei (TW); Yung-Ju Liang, Taipei (TW); Ze-Kai Hsiau, Taipei (TW)

(73) Assignee: KCodes Corporation, Taipei (TW)

( * ) Notice: Subject to any disclaimer, the term of this patent is extended or adjusted under 35 U.S.C. 154(b) by 0 days.

(21) Appl. No.: 13/564,690

(22) Filed: Aug. 1, 2012

(65) Prior Publication Data

US 2013/0159566 A1 Jun. 20, 2013

(30) Foreign Application Priority Data

Dec. 14, 2011 (TW) .............................. 100146133 A

(51) Int. Cl.
*G06F 3/00* (2006.01)
*H04B 1/40* (2006.01)

(52) U.S. Cl.
USPC ............................................. 710/39; 455/74

(58) Field of Classification Search
CPC .......... G06F 13/387; G06F 2213/4002; G06F 2213/0042; G06F 9/455; G06F 9/45533; G06F 3/04842; H04L 12/12
See application file for complete search history.

(56) References Cited

U.S. PATENT DOCUMENTS

| | | | |
|---|---|---|---|
| 6,941,114 B1* | 9/2005 | Kuo et al. | 455/74 |
| 2004/0117538 A1* | 6/2004 | Liu | 710/315 |
| 2008/0320180 A1* | 12/2008 | Manabe | 710/33 |
| 2010/0131687 A1* | 5/2010 | Li et al. | 710/106 |

* cited by examiner

*Primary Examiner* — Hyun Nam
(74) *Attorney, Agent, or Firm* — Venjuris, P.C.

(57) ABSTRACT

A method for accelerating signal transmission in a USB network protocol architecture having a USB server, a processing device and a peripheral device connected to the USB server. The method includes: intercepting request signals sent from the processing device according to the USB network protocol; sending, by the USB server, virtual request signals to the peripheral device so as to cause the peripheral device to generate control signals corresponding to the virtual request signals; receiving, by the USB server, the control signals from the peripheral device, and transmitting, by the USB server, the control signals to the processing device; and matching, by the processing device, the control signals and the intercepted request signals so as to perform operations corresponding to the control signals. Therefore, the present invention eliminates the need to wait for the arrival of request signals before making responses, thereby accelerating the speed of signal transmission.

9 Claims, 4 Drawing Sheets

SYSTEM AND METHOD FOR ACCELERATING SIGNAL TRANSMISSION

BACKGROUND OF THE INVENTION

1. Field of the Invention

The present invention relates to systems and methods for accelerating signal transmission, and, more particularly, to a signal transmission acceleration system and method applicable to a USB over IP protocol.

2. Description of Related Art

Along with the rapid advancement of science and technology, various transmission methods have been developed for signal transmission between electronic devices, ranging from wired transmission to wireless transmission and from short-distance transmission to long-distance transmission so as to overcome space and distance limitations and improve the use convenience.

For example, a game console is connected, in a wired or wireless manner, to a display device such as a TV. The user uses the game console to play a game on the display device such that the relative positions of the game console and the display device are limited. In another example, to play an online game requires a computer and at least a peripheral control device. The computer is usually connected to a TV for a larger view and the user needs to use the peripheral control device to control the game. As such, the relative positions of the computer and the TV are limited. Therefore, a USB over IP technology is proposed such that a periphery control device and a TV set connected to a USB server that is further connected to a computer at a long distance, thereby removing the above-described position limitations.

FIG. 1 is a schematic view showing signal transmission in a USB over IP architecture. Referring to FIG. 1, a computer 200 is disposed in a study room. A display device 400, a USB server 100 and peripheral devices 300 connected to the USB server 100 are disposed in a living room. The computer 200 is connected, in a wired or wireless manner, to the USB server 100. Although not directly connected to the computer 200, the peripheral devices 300 can communicate with the computer 200 through the USB server 100 by using the USB over IP technology. A signal transmission process is as follows. The computer 200 sends request signals to the peripheral devices 300 through the USB server 100, and the peripheral devices 300 send response signals to the computer 200 through the USB server 100. In other words, if no request signal is sent from the computer 200 to the peripheral devices 300, no response signal is generated by the peripheral devices 300. Therefore, although such a USB over IP architecture improves the use convenience, the speed of signal transmission is slowed down. For example, when the user presses down a key, since the response signal only can be generated after the arrival of the request signal, a response delay may likely occur, thereby adversely affecting instant transmission and display of game, audio or video files.

Therefore, although the USB over IP architecture solves the remote control problem, it is difficult to meet instant transmission and display requirements due to the response delay. Accordingly, there is a need to provide a system and method applicable in a USB over IP architecture so as to overcome the conventional drawbacks.

SUMMARY OF THE INVENTION

In view of the above-described drawbacks, the present invention provides a pre-fetch mechanism so as to accelerate signal transmission between devices in a USB over IP (also referred to as a USB network protocol) architecture.

In order to achieve the above and other objects, the present invention provides a system for accelerating signal transmission in a USB network protocol architecture. The system comprises a USB server connected to at least a peripheral device and a processing device connected to the USB server through the USB network protocol, wherein the USB server comprises a request module for actively sending virtual request signals to the peripheral device so as to cause the peripheral device to generate control signals corresponding to the virtual request signals, and a communication module for receiving and transmitting the control signals generated by the peripheral device; and the processing device has a processing module for intercepting request signals sent from the processing device according to the USB network protocol, receiving the control signals transmitted through the communication module, and matching the control signals and the request signals so as for the processing device to perform operations corresponding to the control signals of the peripheral device.

In an embodiment, the processing module has a storage unit for temporarily storing the control signals or the request signals.

In another embodiment, the system further comprises a display device connected to the USB server for displaying response information that is generated by the processing device after performing the operations corresponding to the control signals.

The present invention further provides a method for accelerating signal transmission in a USB network protocol architecture having a USB server, a processing device and at least a peripheral device connected to the USB server. The method comprises the steps of: (1) intercepting request signals sent from the processing device according to the USB network protocol; (2) sending, by the USB server, virtual request signals to the peripheral device so as to cause the peripheral device to generate control signals corresponding to the virtual request signals; (3) receiving, by the USB server, the control signals generated by the peripheral device and transmitting, by the USB server, the control signals to the processing device; and (4) matching, by the processing device, the control signals and the request signals so as to perform operations corresponding to the control signals of the peripheral device.

Compared with the prior art, the present invention pre-fetches control signals of the peripheral device so as to eliminate the need to wait for the arrival of request signals before making responses as in the prior art. Therefore, the present invention saves the transmission time, accelerates wireless signal transmission between the USB server and the processing device in the USB network protocol architecture and reduces the possibility of display delay without changing the original device architecture.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 1:
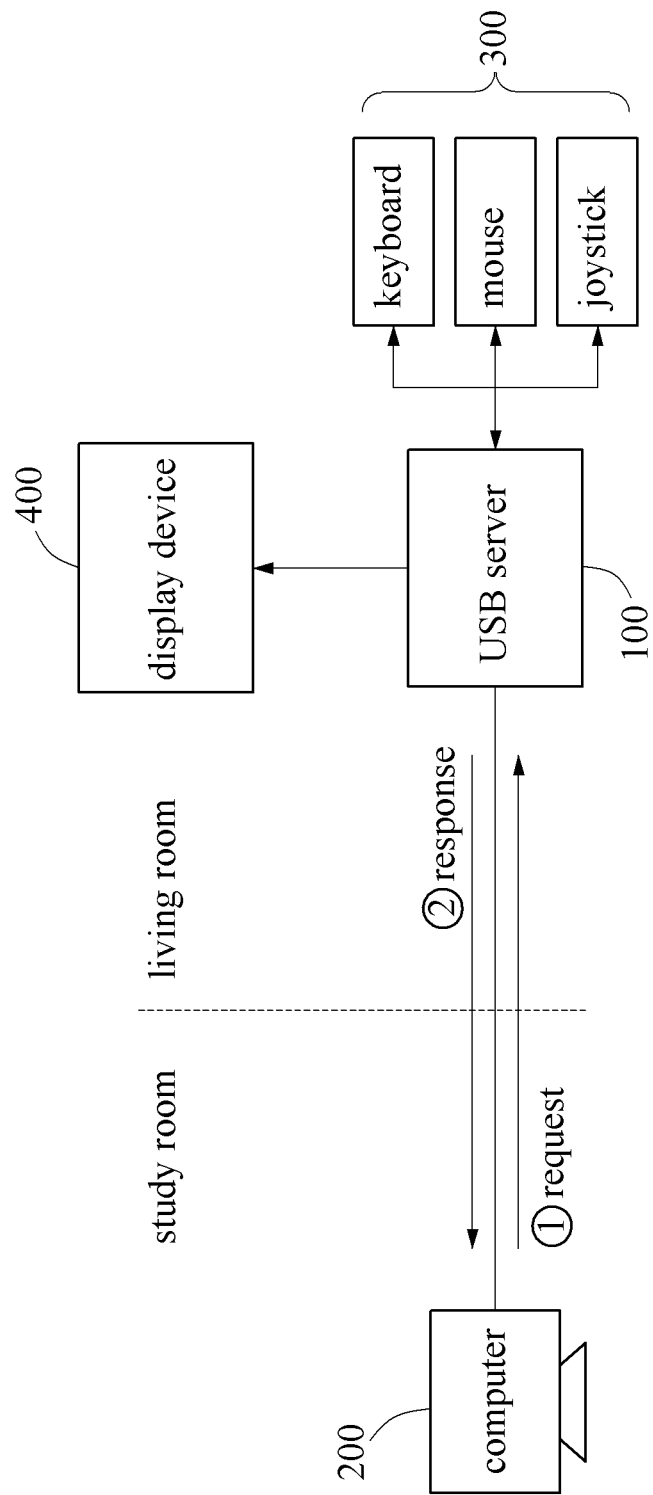
FIG. 1 is a schematic view showing signal transmission in a USB over IP architecture of the prior art.
Figure 2:
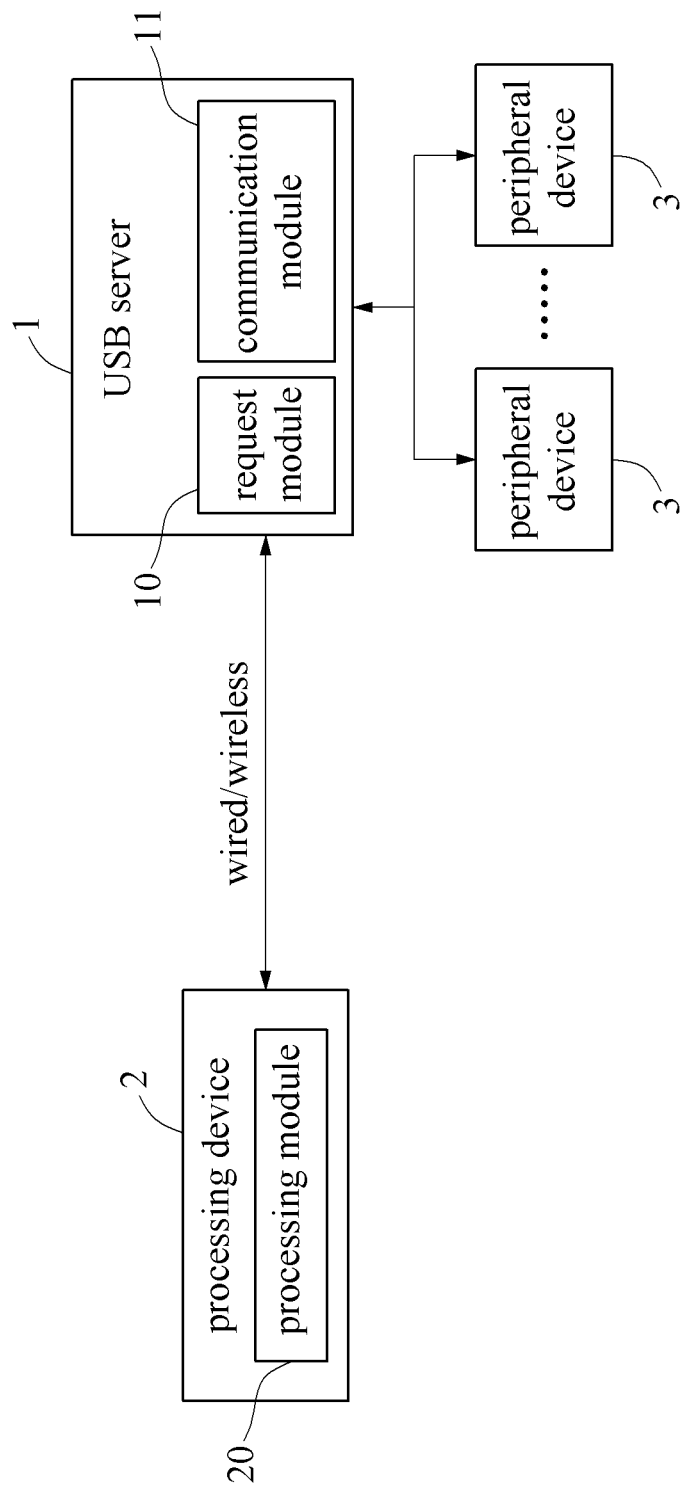
FIG. 2 is a schematic view of a system for accelerating signal transmission in a USB network protocol architecture according to an embodiment of the present invention.

FIG. 2 is a schematic view of a system for accelerating signal transmission in a USB network protocol architecture. The system connects various USB devices by using the USB network protocol technology. The present invention uses a pre-fetch mechanism to save wait time and avoid response delay. But it should be noted that the present invention does not change the original USB network protocol architecture. The system of the present invention comprises a USB server 1, a processing device 2, and at least a peripheral device 3 connected to the USB server 1.

The peripheral device 3 is connected to the processing device 2 through the USB server 1 in the USB network protocol architecture. The USB server 1 has a request module 10 and a communication module 11. The request module 10 is used for actively sending virtual request signals to the peripheral device 3 so as to cause the peripheral device 3 to generate control signals corresponding to the virtual request signals. The communication module 11 is used for receiving the control signals generated by the peripheral device 3 and transmitting the control signals to the processing device 2 for processing. The peripheral device 3 can be a mouse, a joystick, a keyboard or a USB input device.

The processing device 2 is connected, in a wired or wireless manner, to the USB server 1 through the USB network protocol. The processing device 2 has a processing module 20 for intercepting request signals sent from the processing device 2 according to the USB network protocol. In particular, the request signals sent from the processing device 2 can be operational requirements from a game or peripheral device in operation. The processing module 20 further receives the control signals transmitted through the communication module 11 and matches the control signals and the request signals so as for the processing device 2 to perform operations corresponding to the control signals of the peripheral device 3. In particular, different from the conventional transmission process of sending request signals from the processing device 2 and waiting for responses from the peripheral device 3, the present invention intercepts the request signals and matches the request signals and control signals from the peripheral device 3 so as to perform operations corresponding to the control signals.

Compared with the prior art, the present invention pre-fetches control signals from the peripheral device 3. That is, the USB server 1 generates virtual request signals so as to pre-fetch control signals corresponding to the virtual request signals from the peripheral device 3. Further, the processing device 2 intercepts request signals sent from the processing device 2. In other words, the request signals are never sent to the USB server 1. Accordingly, the peripheral device 3 does not respond to the request signals of the processing device 2. Instead, the peripheral device 3 only sends the control signals corresponding to the virtual request signals of the USB server 1. The USB server 1 further transmits the control signals to the processing device 2. Therefore, the USB server 1 does not need to receive request signals from the processing device 2 so as to request responses from the peripheral device 3 as in the prior art, thereby saving the time for transmitting the request signals to the USB server 1 and shortening the time for transmitting the control signals to the processing device 2. Therefore, the present invention reduces the overall response time and reduces the possibility of response delay.

Figure 3:
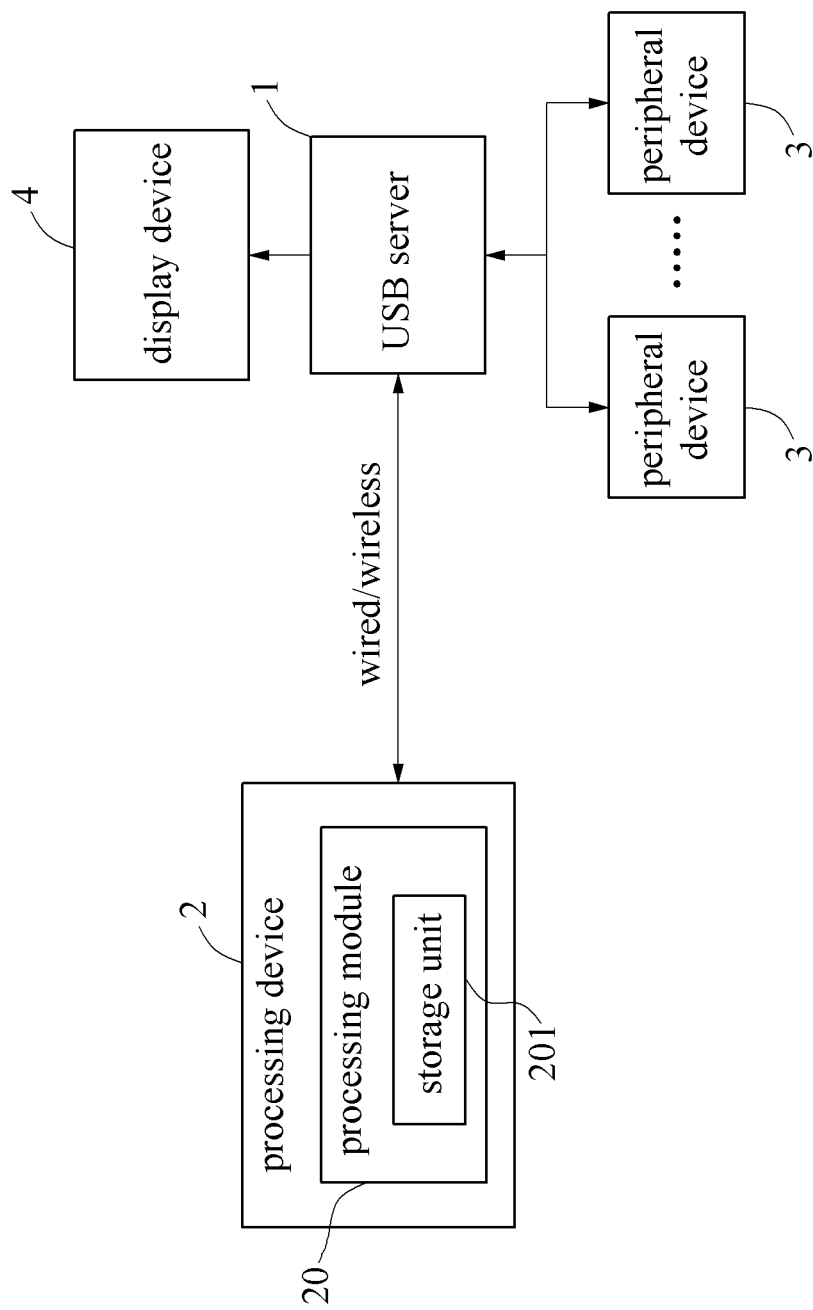
FIG. 3 is a schematic view of a system for accelerating signal transmission in a USB network protocol architecture according to another embodiment of the present invention.

FIG. 3 shows a system for accelerating signal transmission in a USB network protocol architecture according to another embodiment of the present invention. Referring to FIG. 3, the system of the present embodiment has a USB server 1, a processing device 2 having a processing module 20, and at least a peripheral device 3. These components are the same as those of FIG. 2, and detailed description thereof is omitted herein. In addition, the system of the present embodiment has a display device 4 connected to the USB server 1, and the processing module 20 further has a storage unit 201.

The storage unit 201 of the processing module 20 is used for temporarily storing control signals or request signals. In particular, request signals sent from the inside of the processing device 2 are intercepted and temporarily stored in the storage unit 201 to wait for being matched with control signals transmitted through the USB server 1. Similarly, if control signals pre-fetched by the USB server are transmitted to the processing device 2 while no request signals are sent from the processing device 2, the control signals can be temporarily stored in the storage unit 201 to wait for being matched with request signals intercepted by the processing module 20. The storage unit 201 is not necessarily disposed in the processing module 20. Further, the storage unit 201 can be replaced by other memory units.

In the present embodiment, the display device is connected to the USB sever 1 for displaying response information that is generated by the processing device 2 after performing operations corresponding to the control signals. In particular, when finding request signals that match with the control signals, the processing module 20 of the processing device 2 performs operations corresponding to the control signals. For example, the operation can be a key press instruction. After the processing device 2 finishes the operation, the processing device 2 generates response information and sends the response information to the USB server 1 so as for the display device 4 to display the response information. For example, to make a game character jump, the user presses a jump key through a joystick. Then, jump of the game character is displayed on the display screen.

In another example, the processing device 2 is used for processing game programs and the peripheral device 3 is a joystick provided for the user. The display device 4 can be a high definition multimedia interface (HDMI) display. During a game, the user continuously inputs multiple control signals through the joystick without the need to wait for request signals from the game programs of the processing device 2. As such, the control signals can be pre-fetched so as to be transmitted to the processing device 2 for processing. After matching the request signals and the control signals and performs operations corresponding to the control signals, the processing device 2 generates response information such as sounds, image changes or game controls. The response information is further transmitted to the USB server 1 so as to be displayed on the display device. Therefore, the user is not necessarily in the same room as the processing device 2 for game play. Instead, the user only needs to connect the joystick and the display device to the USB server 1 for game play.

Figure 4:
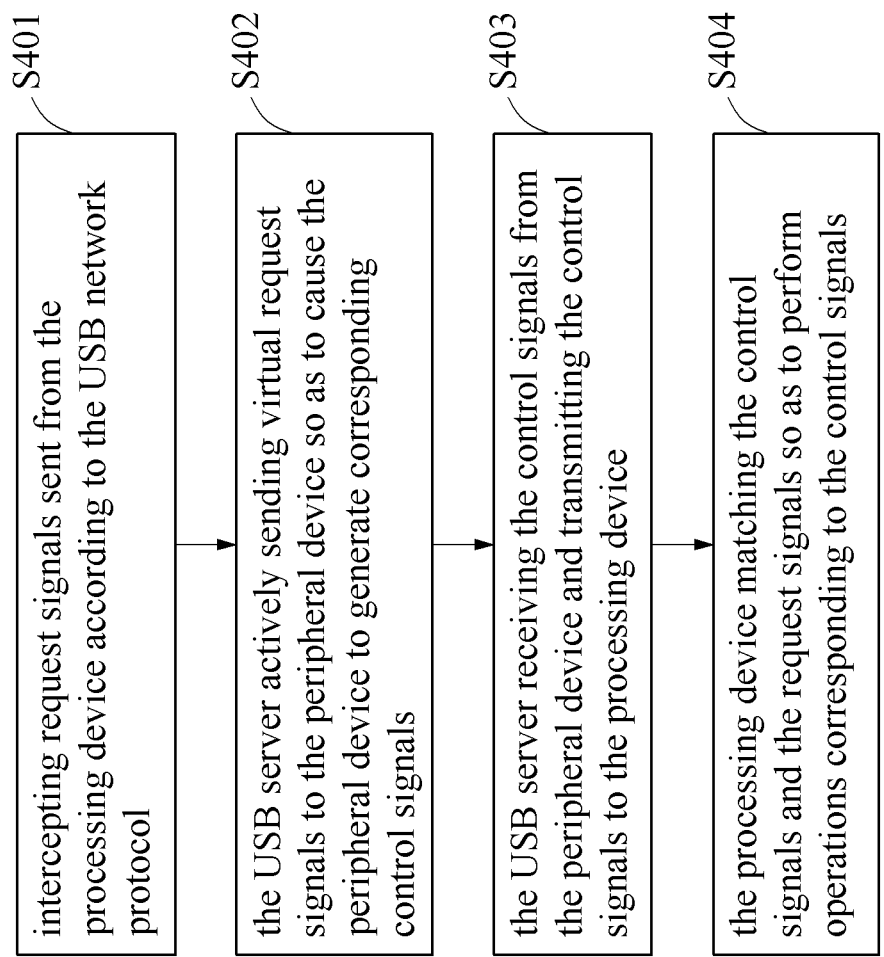
FIG. 4 is a flow diagram showing a method for accelerating signal transmission according to the present invention.

FIG. 4 is a flow diagram showing a method for accelerating signal transmission in a USB network protocol architecture having a USB server, a processing device and a peripheral device connected to the USB server. Referring to FIG. 4 in combination with FIGS. 2 and 3, at step S401, request signals sent from the processing device according to the USB network protocol are intercepted. In other words, the request signals need not to be sent to the USB server. Then, the method goes to step S402.

At step S402, the USB server actively sends virtual request signals to the peripheral device so as to cause the peripheral device to generate control signals corresponding to the virtual request signals. That is, the USB server actively sends virtual request signals to inform the peripheral device to respond with control signals, thereby eliminating the need to receive request signals from the processing device before requesting control signals. Therefore, the virtual request signals are only used for pre-fetching the control signals. They are not request signals sent from the processing device.

It should be noted that at step S402, the USB server can generate the virtual request signals after receiving a connection request from the processing device. That is, after the processing device sends a request for connection, data transmission can be performed between the peripheral device and the processing device via the USB server. Therefore, it can be preset that after the processing device sends a connection request, the USB server can send the virtual request signals to the peripheral device. But the present invention is not limited thereto. Alternatively, the pre-fetch operation can be started after the processing device sends a first request signal. Then, the method goes to step S403.

At step S403, the USB server receives the control signals from the peripheral device and transmits the control signals to the processing device. In particular, the USB server pre-fetches the control signals from the peripheral device and transmits the control signals to the processing device so as to save the time for transmitting the request signals from the processing device to the USB server and shorten the time for generating and transmitting the control signals to the processing device, thereby accelerating the overall control response. Then, the method goes to step S404.

At step S404, the processing device matches the control signals and the request signals so as to perform operations corresponding to the control signals of the peripheral device. That is, the processing device matches the intercepted request signals and the control signals actively transmitted from the USB server so as to perform the content of the control signals.

At step S401, the processing device can temporarily store the request signals. The request signals intercepted by the processing device may be sent by internal programs according to operations to be performed and may be processed later. Similarly, at step S403, the processing device can temporarily store the control signals before processing.

In an embodiment, after performing the operations corresponding to the control signals, the processing device generates response information and transmits the response information to the display device connected to the USB server. In particular, the response information is transmitted to the USB server so as to be displayed on the display device.

According to the present invention, the USB server pre-fetches control signals of the peripheral device and transmits the control signals to the processing device so as for the processing device to match request signals generated by its internal programs and the control signals and perform operations corresponding to the control signals, thereby saving the time for transmitting the request signals from the processing device to the USB server, shortening the time for generating and transmitting the control signals and accelerating the signal transmission, especially wireless signal transmission in the USB network protocol architecture.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A system for accelerating signal transmission in a USB network protocol architecture, comprising:
    a USB server connected to at least a peripheral device, comprising:
        a request module for actively sending virtual request signals to the at least a peripheral device so as to cause the at least a peripheral device to generate control signals corresponding to the virtual request signals; and
        a communication module for receiving and transmitting the control signals generated by the at least a peripheral device; and
    a processing device connected to the USB server through the USB network protocol, comprising:
        a processing module for intercepting request signals sent from the processing device according to the USB network protocol, receiving the control signals transmitted by the communication module, and matching the control signals and the request signals so as for the processing device to perform operations corresponding to the control signals of the at least a peripheral device,
        wherein the request signals are free from being sent to the USB server and the virtual request signals are not the request signals sent from the processing device.

2. The system of claim 1, wherein the processing module has a storage unit for temporarily storing the control signals or the request signals.

3. The system of claim 1, wherein the at least a peripheral device is a mouse, a joystick, a keyboard or other input devices.

4. The system of claim 1, wherein the USB server is connected to a display device that displays response information generated by the processing device after performing the operations corresponding to the control signals.

5. A method for accelerating signal transmission in a USB network protocol architecture having a USB server, a processing device and at least a peripheral device connected to the USB server, the method comprising the steps of:
    (1) intercepting request signals sent from the processing device according to the USB network protocol, wherein the request signals are free from being sent to the USB server;
    (2) sending, by the USB server, virtual request signals to the at least a peripheral device so as to cause the at least a peripheral device to generate control signals corresponding to the virtual request signals, wherein the virtual request signals are not the request signals sent from the processing device;
    (3) receiving, by the USB server, the control signals generated by the at least a peripheral device, and transmitting, by the USB server, the control signals to the processing device; and
    (4) matching, by the processing device, the control signals and the request signals so as to perform operations corresponding to the control signals of the at least a peripheral device.

6. The method of claim 5, wherein at step (1), the processing device temporarily stores the request signals.

7. The method of claim 5, wherein at step (2), the USB server generates the virtual request signals after receiving a connection request from the processing device.

8. The method of claim 5, wherein at step (3), the processing device temporarily stores the control signals.

9. The method of claim 5, wherein the at least a peripheral device is a mouse, a joystick, a keyboard or other input devices.

* * * * *